United States Patent [19]
Das et al.

[11] Patent Number: 6,153,089
[45] Date of Patent: Nov. 28, 2000

[54] UPGRADATION OF UNDESIRABLE OLEFINIC LIQUID HYDROCARBON STREAMS

[75] Inventors: Asit Kumar Das; Sukumar Mandal; Sobhan Ghosh; Debasis Bhattacharyya; Ganga Shanker Mishra; Jagdev Kumar Dixit; Arvind Pratap Singh; Ashok Kumar Tewari, all of Faridabad; Satish Makhija, New Delhi; Manoranjan Santra, Faridabad; Latoor Lal Saroya, Faridabad; Shankar Sharma, Faridabad; Satyen Kumar Das, Faridabad, all of India

[73] Assignee: Indian Oil Corporation Limited, Mumbai, India

[21] Appl. No.: 09/282,174

[22] Filed: Mar. 31, 1999

[51] Int. Cl.[7] .................................................. C10G 35/095
[52] U.S. Cl. ........................ 208/134; 208/135; 208/136; 208/137; 208/138; 208/140; 208/141; 208/120.01; 208/120.3; 208/120.35; 208/120.05
[58] Field of Search ........................... 208/120.01, 120.3, 208/120.35, 120.05, 134, 135, 136, 137, 138, 140, 141

[56] References Cited

U.S. PATENT DOCUMENTS

| | | | |
|---|---|---|---|
| 3,758,628 | 9/1973 | Strickland et al. | 260/683.43 |
| 3,760,024 | 9/1973 | Cattanach | 260/673 |
| 3,770,614 | 11/1973 | Graven | 208/62 |
| 3,816,294 | 6/1974 | Wilson et al. | 208/61 |
| 3,847,793 | 11/1974 | Schwartz et al. | 208/70 |
| 3,890,218 | 6/1975 | Morrison | 208/135 |
| 3,894,934 | 7/1975 | Owen et al. | 208/78 |
| 3,960,978 | 6/1976 | Givens et al. | 260/683.15 R |
| 4,032,432 | 6/1977 | Owen | 208/70 |
| 4,072,600 | 2/1978 | Schwartz | 208/120 |
| 4,122,640 | 10/1978 | Commins et al. | 52/248 |
| 4,150,062 | 4/1979 | Garwood et al. | 260/673 |
| 4,197,185 | 4/1980 | Le Page et al. | 208/71 |
| 4,309,279 | 1/1982 | Chester et al. | 208/120 |
| 4,359,378 | 11/1982 | Scott | 208/120 |
| 4,368,114 | 1/1983 | Chester et al. | 208/120 |
| 4,433,185 | 2/1984 | Tabak | 585/312 |
| 4,642,403 | 2/1987 | Hyde et al. | 585/415 |
| 4,834,867 | 5/1989 | Gilson | 208/120 |
| 4,912,273 | 3/1990 | Harandi et al. | 585/322 |
| 4,933,069 | 6/1990 | Huss, Jr. et al. | 208/118 |
| 4,968,403 | 11/1990 | Herbst et al. | 208/113 |
| 4,980,053 | 12/1990 | Li et al. | 208/120 |
| 5,000,837 | 3/1991 | Harandi | 208/67 |
| 5,002,653 | 3/1991 | Kennedy et al. | 208/118 |
| 5,100,534 | 3/1992 | Le et al. | 208/70 |
| 5,167,795 | 12/1992 | Gartside | 208/67 |
| 5,258,114 | 11/1993 | Aufdembrink et al. | 208/113 |
| 5,318,696 | 6/1994 | Kowalski | 208/120 |
| 5,372,704 | 12/1994 | Harandi et al. | 208/74 |
| 5,456,821 | 10/1995 | Absil et al. | 208/114 |
| 5,702,589 | 12/1997 | Tsang et al. | 208/67 |
| 5,888,378 | 3/1999 | Kowalski | 208/114 |

*Primary Examiner*—Walter D. Griffin
*Assistant Examiner*—Nadine Preisch
*Attorney, Agent, or Firm*—Venable; George H. Spencer; Charles C. Rories

[57] ABSTRACT

A process for converting undesirable olefinic hydrocarbon streams to hydrogen and petrochemical feedstock e.g. light olefins in $C_2$–$C_4$ range and aromatics especially toluene and xylenes, which comprises simultaneous cracking and reforming at olefin rich hydrocarbons using a catalyst consisting of dehydrogenating metal components, shape selective zeolite components and large pore acidic components in different proportions in a circulating fluidized bed reactor-regenerator system having reactor temperature within 450–750° C. and WHSV of 0.1–60 hour$^{-1}$.

20 Claims, No Drawings

UPGRADATION OF UNDESIRABLE OLEFINIC LIQUID HYDROCARBON STREAMS

FIELD OF THE INVENTION

The present invention is related to the upgradation of undesirable olefinic liquid hydrocarbon streams to high value petrochemical feedstock e.g. ethylene, propylene, butylene, toluene and xylenes—through simultaneous reforming and cracking reactions using multifunctional solid catalyst in circulating fluidized bed reactor-regenerator system.

DESCRIPTION OF THE PRIOR ART

The photo-chemically reactive olefins, which are a major hydrocarbon factor in the smog problems, have prompted the California Air Resources Board to control total gasoline olefin content up to 6 vol % maximum. The legislation requires the removal of olefins from light gasoline via very expensive hydro-processing process, resulting in a significant octane loss.

Olefins are also undesirable since the Motor Octane Number (MON) of olefinic gasoline is not very attractive as compared to isomerates and alkylates. With increasingly stringent requirement of higher MON in new reformulated gasoline scenario, significant amount of olefinic gasoline streams need to be replaced with blending stocks having both higher Research Octane Number (RON) and MON value. The other important consideration is the higher gum forming tendency of the olefin rich naphtha streams. For example, coker and visbreaker naphtha, although blended in very small quantity (<5 vol %) in gasoline pool, causes major problems of gum formation during storage of gasoline. These along with lower vapor pressure requirement of the reformulated gasoline are forcing refiners to look for alternate gasoline blending streams e.g. isomerates, alkylates and oxygenates as compared to the conventional FCC gasoline and reformat.

In most of European and North American refineries, 30–40% of gasoline pool usually comes from FCC gasoline. The olefins in FCC gasoline vary from 40–70 vol % depending on the severity of operation and catalyst composition used. Other olefinic gasoline streams, for example, visbreaker naphtha and coker naphtha have olefins usually above 15–40 vol %. There is also higher quantity of di-olefins in thermally cracked streams which are strong precursors of potential gum formation. Proper disposal of these di-olefinic naphtha streams is a constant source of problem to the refiners worldwide.

On the other hand, the worldwide requirement of light olefins ($C_2$–$C_4$ range) is significantly increasing partly for the higher demand of alkylates and oxygenates which are favored streams for making reformulated gasoline. Incidentally, the stringent specification of benzene content in gasoline is restricting the use of reformate in gasoline pool.

In such situation, refiners are not only required to reduce olefins in gasoline but also have to produce light olefins to be used as feed for alkylation/oxygenate production.

Currently, processes available for olefins reduction in gasoline are mostly based on use of hydrogen for hydrotreating FCC feed or hydrotreating of olefinic FCC naphtha. These however, result in significant octane loss and higher hydrogen consumption.

Mobil's light olefin to gasoline process converts $C_2$–$C_4$ olefins as feed using oligomerization, alkylation and hydrogen transfer route. Similarly, Alpha process developed by Ashai Chemicals, Japan, aims to convert FCC $C_3$, $C_4$ stream to an aromatic rich high octane blending component but having higher benzene content. The other application is the aromatization of FCC gasoline. However, the major problem is that the total aromatics content in the gasoline pool goes up with this route. Similarly, the benzene content of the gasoline is equally very high. The process uses fixed bed reactors in swing operation in which catalyst activity reduces with time due to coke deposition on the catalyst and thus requires regeneration every several days.

U.S. Pat. No. 3,847,793 talks about adding 5–10% ZSM 5 in Y-Zeolite FCC catalyst and contacting in riser and dense bed with gas oil and residues as feed. U.S. Pat. No. 4,032,432 describes a combination operation comprising gas oil cracking in the presence of a large and small pore size crystalline zeolite dual component cracking catalyst in which $C_6$ minus products are selectively upgraded under conditions suitable for oligomerization and cyclization. The feed in this process comprises of relatively higher boiling hydrocarbons than gasoline. U.S. Pat. No. 4,912,273 describes a combination of series of reactor beds to convert lower alkanes to produce aromatic feedstock. Li et. al. describe a process in U.S. Pat. No. 4,980,053 where vacuum gas oil is contacted with a catalyst consisting of pentasil zeolite and ultra stable Y-zeolite to maximize the production of propylene and butylene. U.S. Pat. No. 5,167,795 describes a process for catalytic cracking of a hydrocarbon feedstock of $C_4$–$C_7$ paraffins, naphthenes etc. to selectively produce aromatics and ethylene mixture by varying the contact time of a hydrocarbon in catalytic and thermal cracking zone. Hsing et. al. uses a mixture of $A_1$ and B zeolite to maximize the olefins of $C_3$–$C_8$ range hydrocarbons.

In the past, there have been many applications employing combination of processes to meet the requirement of high octane gasoline. For example, U.S. Pat. No. 3,758,628 proposes a combined hydrocraking of naphtha and subsequent alkylation of $C_3$, $C_4$ olefins to yield high octane gasoline. U.S. Pat. No. 3,816,294 describes a process for increased gasoline yield by isomerizing and cracking of low octane paraffin stream and then alkylating the iso-butane fraction with an olefin fraction recovered by thermally steam cracking the de-isobutanized isomerized cracked stream. Similarly, U.S. Pat. No. 3,890,218 proposes a process with modified ZSM-5 for upgrading aliphatic naphtha to higher octane gasoline. U.S. Pat. No. 4,834,867 describes a process for producing gasoline under FCC conditions employing a cracking catalyst consisting of conventional FCC catalyst and zeolite beta, modified with gallium, zinc or mixtures thereof. The catalyst substantially increases the aromatic selectivity of the gasoline. U.S. Pat. No. 5,100,534 proposes a combination of cracking, etherification and reforming in three different reactors to convert paraffinic naphtha into higher octane gasoline. U.S. Pat. No. 5,702,589 discloses a process to oligomerize $C_2$–$C_8$ olefins into $C_4$/$C_5$ olefins and iso-paraffins using spent FCC catalyst. U.S. Pat. No. 3,760,024 describes a process for the preparation of aromatic compound from $C_2$–$C_4$ hydrocarbons in absence of hydrogen. A combination process of catalytic reforming and selective conversion of paraffinic component in presence of zeolite catalyst, is disclosed in U.S. Pat. No. 3,770,614. Similarly, U.S. Pat. No. 3,960,978 discloses a process for conversion of $C_2$–$C_5$ olefins to olefinic gasoline blending stock with low activity ZSM-5 zeolite.

U.S. Pat. No. 4,150,062 discloses a process of converting $C_3$–$C_4$ olefins to aromatics in gasoline boiling range.

Similarly, U.S. Pat. No. 4,197,185 discloses a process for converting C4 olefins to high octane gasoline via oligomerization route. U.S. Pat. No. 4,122,640 discloses a process for treatment of highly olefinic gasoline with ZSM-5 at relatively lower reactor temperature of 200–350° C. to enhance the gum stability of said gasoline. Similarly, U.S. Pat. No. 4,433,185 covers two stage system for catalytic conversion of olefins to distillate/gasoline through oligomerization of olefin. U.S. Pat. No. 4,642,403 discloses a process for converting $C_2$ olefins and alkanes with gallium loaded zeolite.

Traditionally, naphtha is thermally cracked in pyrolysis furnace to produce lighter olefins mainly ethylene and partly propylene. Naphtha cracker is the mother unit in a petrochemical complex which supplied light olefinic feedstock. One of the major problems in conventional naphtha cracking is that the propylene and butylene selectivity are not good vis a vis ethylene. However, with the advent of reformulated gasoline, the demand of alkylate and oxygenates are increasing. Moreover, the demand of propylene is going up for use as petrochemical feedstock. Therefore, it is necessary to maximize the production of light olefins particularly $C_3$, $C_4$ olefins in petrochemical complex in the present scenario.

The other important aspect is the production of aromatic feedstock for downstream petrochemicals. Conventionally, catalytic reforming is the preferred process for producing aromatics (benzene, tolyene, xylene) which uses straight run naphtha as feedstock. Catalytic reforming uses fully desulfurized naphtha and requires sufficient hydrogen circulation to minimize coke formation. These steps indeed add to the capital and operating cost of catalytic reforming process. However, with recent specification of benzene and total aromatics in gasoline, catalytic reforming faces tremendous challenge to maintain its place in the modern refineries.

OBJECTS OF THE INVENTION

An object of this invention is to propose a process where olefin rich liquid hydrocarbon is made olefin free with simultaneous conversion to lighter hydrocarbons, mainly, LPG for use as olefinic feedstock and catalytic reforming of the remaining liquid to maximize the production aromatics particularly toluene and xylene.

Another object of this invention is to propose a process to achieve substantial reforming of hydrocarbons without using external hydrogen supply or without desulfurizing the feed before hand.

Yet another object of this invention is to propose a process to produce significant amount of net hydrogen which is so essential in modern petroleum refineries.

Another object is to provide a process where olefinic and aromatic feedstock for petrochemical application are produced in a single step catalytic process having sufficient flexibility to vary the ratio of olefin to aromatic make and ethylene to propylene, substantially at ease.

DETAILED DESCRIPTION OF INVENTION

According to this invention there is provided a process for upgrading olefinic hydrocarbon streams through simultaneous cracking and reforming using a catalyst consisting of dehydrogenating metal component, medium pores shape selective zeolite components and large pore acidic crystalline or amorphous component, where the catalyst are microspherical in nature having particle size within 20–150 microns, where the feed hydrocarbon is injected in the fluidized bed riser in presence of hot catalyst mixture, separating the product at the top of the reactor, withdrawing spent catalyst from the bottom of the reactor after steam purging and regenerating the spent catalyst by burning of the coke in presence of air and recirculating the regenerated catalyst back to the reactor to produce a liquid product with higher toluene and xylene yield but with substantially lower olefin and benzene content and a gaseous product rich in hydrogen, ethylene, propylene and butylene yield.

In accordance with the present invention, the hot regenerated catalyst is injected at the bottom of an upflow riser (of relatively smaller height than conventional FCC riser) wherein the olefinic hydrocarbon feed is injected through the nozzle, duly atomized by dispersion and atomization gas, usually steam, ranging from 3–20 wt % of the feed and where the contact time in the riser should be preferably maintained below 0.5 seconds and where the riser top is terminated to a fluidized bed of catalyst operating in bubbling bed preferably dense bed, or most preferably turbulent fluidized bed with a temperature range of 450–700° C. and preferably 500–650° C., with WHSV (Weight Hourly Space Velocity) ranging between 0.1 to 10 $hr^{-1}$. The operating pressure may be varied from 0.2 atm(g) to 8.2 atm(g) and preferably in the range of 0.2–2.0 atm(g). The product hydrocarbons are separated from the catalyst using cyclone separator and sent for further fractionation of different components.

The spent catalyst is passed through a small transfer line on one side of the reactor where steam is purged at a velocity up to 0.5 m/sec. The spent catalyst is sent to the regenerator vessel where the coke deposited on the catalyst is burnt in presence of air/oxygen containing gas and the ensuing exothermic heat maintains the regenerator temperature within 600–750° C. The hot regenerated catalyst is circulated back to the bottom of the riser for continuous reaction/regeneration operation.

Feed

The present process of invention is quite flexible in terms of feed. However, it is preferred that the composite feed should be having minimum 10 wt % olefins and the preferred boiling range is between $C_5$–230° C. It has been observed that our catalyst in the present invention is particularly suited for olefin rich hydrocarbons e.g. coker naphtha/kerosene, FCC gasoline and heavy naphtha, visbreaker naphtha and gas oil, pyrolysis, naphtha etc. Other naphtha and gas oil components can also be upgraded using the process of this invention. However, the desired product yields e.g. aromatics, light olefins and hydrogen are maximized if at least 10% olefins are present in the feed. The gasoline produced in this process is mostly olefin free irrespective of the olefin content of the feedstock.

Catalyst

The objective of the process of the present invention is to achieve substantial cracking and reforming of the feed component. This results in high yield of aromatics in the liquid product and olefins in the gaseous product particularly LPG. Moreover, the olefins are selectively reformed and cracked which results in significant reduction of olefin in the liquid product. Accordingly, the catalyst employed in the present invention uses three types of active components, namely dehydrogenating metal components, medium pore shape selective zeolites and large pore crystalline or amorphous acidic component.

Dehydrogenating Component

This component consists of a metal for example, Platinum, Palladium, Nickel, Molybdenum, Tungsten, Rhenium etc. supported on non-acidic silica/alumina/silica-alumina system.

For preparing 100 grams of the above component, following procedure is followed. 142 grams of pseudo boehmite alumina of typical moisture content of 30% (grade Pural SB from Condea, USA) is peptized in a controlled condition with 6 grams of nitric acid and the solid concentration in the slurry is maintained at 24%. The said slurry is spray dried at 300° C. inlet temperature and 160° C. outlet temperature to produce miro-spheres in the size range of 20–120 microns. The said micro-speherical particles are subjected to a step of calcination at 550° C. for six hours. Cold solid particles are dispersed in a solution containing calculated amount of chloro-platinic or chloro-rhenic acid equivalent to load 3000 ppm platinum and 3800 ppm rhenium. The soaked catalyst is oven dried followed by calcination at 500° C. for three hours. The important properties of the finished component are:

| | |
|---|---|
| Surface area | 222 m²/gm |
| Pore volume | 0.58 gm/cc |
| Iron | 0.02 wt % |
| Platinum | 0.3 wt % |
| Rhenium | 0.38 wt % |

Shapes Selective Medium Pore Zeolite

For preparing 100 grams of this component, following procedure is followed. 40 grams of pseudo boehmite alumina of typical moisture content of 30% (grade Pural SB from Condea, USA) is slurred to 25% solid concentration by adding DM water. The above slurry is acidified with 5 grams of formic acid. To this is added 55.3 grams of kaolin clay (BCK grade from English Clay, India) containing 15% moisture under suitable stirring condition to maintain homogeneity. A fine paste of zeolite is prepared by milling 28 grams of dry zeolite (containing 15% moisture) with 25 grams of DM water. The zeolite is sourced as ZSM-5 zeolite with silica to alumina ratio of 40–50 or beta zeolite of silica to amulina ratio of 18–22 from United Catalyst India Ltd. (UCIL), India. Other shape selective medium pore zeolites from ZSM family may also be considered. But we have observed that ZSM-5 and beta zeolite give better results in terms of higher light olefin and aromatic selectivity. This paste is added to the said slurry and homogenized for 15 minutes. Final slurry is kept around 3 pH and solid concentration about 25–30 wt % max. The said slurry is spray dried at 300° C. inlet temperature and 160° C. outlet temperature with feed rate of 80 grams/minute of slurry. The micro spheres thus obtained are calcined at 550° C. for 1 hour. The properties of the finished product using ZSM-5.

| | |
|---|---|
| ASTM Mat activity | 45 wt % |
| Surface area | 35 m²/gm |
| Pore volume | 0.28 cc/gm |
| Aluminum | 32.4 wt % |
| App. Bulk density | 0.81 gm/cc |
| Average particle size | 70 micron |

X-ray diffraction pattern of ZSM-5 zeolite:

| d(Å) | 100 (I/I$_o$) | d | 100 (I/I$_o$) | d(Å) | 100 (I/I$_o$) | d(Å) | 100 (I/I$_o$) |
|---|---|---|---|---|---|---|---|
| 11.11 | 28 | 5.697 | 8 | 3.813 | 78 | 2.965 | 11 |
| 9.983 | 19 | 5.555 | 11 | 3.743 | 35 | 2.727 | 4 |
| 9.72 | 9 | 5.13 | 5 | 3.712 | 56 | 2.604 | 5 |
| 7.43 | 10 | 4.99 | 4 | 3.642 | 30 | 2.49 | 5 |
| 7.069 | 6 | 4.602 | 12 | 3.437 | 12 | 2.412 | 5 |
| 6.686 | 5 | 4.354 | 13 | 3.341 | 9 | 2.008 | 10 |
| 6.347 | 8 | 4.254 | 12 | 3.294 | 8 | 1.989 | 12 |
| 6.049 | 9 | 4.001 | 8 | 3.046 | 12 | 1.95 | 3 |
| 5.968 | 8 | 3.847 | 100 | 2.983 | 14 | 1.919 | 4 |

Large Pore Zeolite/Matrix

For preparing 100 grams of this component, following procedure is followed. 40 grams of pseudo bohemia alumna of typical moisture content of 30% (grade Purl SB from Conned, USA) is slurred to 25% solid concentration by adding DM water. The above slurry is acidified with 5 grams of formic acid. To this 55.3 grams of kaolin clay (BCK grade from English Clay, India) containing 15% moisture is added under suitable stirring condition to maintain homogeneity. A fine paste of zealot is prepared by milling 33.3 grams of dry zealot (containing 25% moisture and 2.8 wt. rare earth oxide) with 25 grams of DM water. The zealot is soured as Y-zeolite form LZY-52 (Union Carbide, USA). Controlled amount of active matrix in the form of silica alumna is also added to maintain the zealot/matrix ratio within 2–4. This paste is added to the said slurry and homogenized for 15 minutes. Final slurry is kept around 3 pH and solid concentration about 25–30 wt. max. The said slurry is spray dried at 300° C. inlet temperature and 160° C. outlet temperature with feed rate of 80 grams/minute of slurry. The microspheres, thus obtained are calcimined at 550° C. for 6 hours. The properties of the finished product are:

| | |
|---|---|
| ASTM Mat activity | 66 wt % |
| Surface area | 172 m²/gm |
| Pore volume | 0.25 cc/gm |
| Crystallinity | 13.8% |
| UCS | 24.55 Å |
| Aluminum | 36.4 wt % |
| Re$_2$O$_3$ | 0.69 wt % |
| App. Bulk density | 0.81 gm/cc |
| Average particle size | 76 micron |

The process of the present invention although uses dehydrogenating metal component as part of the catalyst, it does not require mixing hydrogen with the feed or desulfurization of the feed. The catalyst is recirculated between the reactor and regenerator which helps in burning of any sulfur deposited on the catalyst almost continuously. This greatly helps to minimize the capital and operating cost since the use of hydrogen and high pressure hydrotreating can be avoided.

Other important aspect of our invention is that olefin can be directly converted to desirable product in the reactor itself unlike conventional reforming process where olefins are totally removed to avoid the coke formation on the catalyst in the reactor. It may also be noted that olefinic naphtha streams e.g., Coker, FCC and Visbreaker naphtha are also not usually sent for hydrogen production to avoid coking in reforming catalyst. The catalyst and the contacting system in the present invention however are capable to handle as much olefins in the feed and directly crack and reform it without adding any external hydrogen.

The other important benefit of the invention is its flexibility to produce gasoline with high octane rating but with relatively lower benzene content as compared to than reformate gasoline. However, toluene and xylenes and maximized in the process. By changing the process conditions and catalyst, it is quite possible to alter the degree cracking to reforming reactions significantly and therefore, gas to liquid product ratio. The gasoline octane no. is usually above 95 or even 100.

One can selectively choose to vary the ratio of different olefins for example ethylene to propylene. It may be noted that changing such ratio in conventional thermal cracking of naphtha is not very easy. However, by choosing proper conditions and catalyst, one can easily alter the ratio of various olefins in our process.

Hydrogen is required in all modern refineries. Our process can be targeted to maximize hydrogen production from problematic olefinic streams e.g. Coker and Visbreaker naphtha etc. Other advantages and features of our invention are further illustrated in the following examples. These examples are illustrative only, and not to be construed as limiting the scope of the invention.

EXAMPLE-1

Olefin Reduction in Liquid Product

This example illustrates the olefin reduction capability of the present invention in the ensuing liquid product. Results are summarized in Table-1. Following nomenclature are generally applicable for all the examples cited here:

| D | Dehydrogenating component |
|---|---|
| M | Medium pore zeolite component |
| L | Large pore zeolite/matrix component |
| VBN | Vibreaker Naphtha (C5–120° C. cut) |
| CN | Coker Naphtha (C5–150° C. cut) |
| FCCN | FCC Gasoline (C5–150° C. cut) |
| KERO | Kerosene cut (170–230° C. cut) |
| SRN | Straight Run Naphtha (C5–150° C.) |

It may be noted here that there is significant reduction of olefin content in the liquid product by employing the catalyst and the system of the present invention irrespective of the olefin content in the feed. When the dehydrogenating component is used alone as catalyst, there is still some residual olefin in the gasoline. However, in other cases, the liquid product olefin content have reduced substantially irrespective of the feed olefin content. For example, it has been possible here to convert highly olefinic FCC gasoline (FCCN) and coker naphtha (CN) into liquid product having less than 0.5 wt % olefins. The olefin content of the liquid product has been determined using H-NMR technique. The olefin content of the individual feeds are indicated at the bottom of Table-1. The reaction is conducted in a fixed bed micro reactor at a WHSV of 4–5 hr$^{-1}$ with the reactor temperature in the range of 575–650° C. and the procedure followed during experimentation are described below.

The fixed bed reactor is similar to Micro Activity Test (MAT) unit used for determining the activity of FCC catalyst. Usually about 3–4 grams of solid catalyst micro spheres are taken and the catalyst bed is supported by ceramic wool. Pressure testing is done to ensure that the reactor set up is leak proof. The reactor assembly is housed inside a three zone split type heating furnace fitted with independent heaters and controllers. The desired reactor temperatures are set in the controllers. When these temperatures are within +1° C. of the set point, pre-calculated quantity of feed is injected through a syringe pump into the reactor for 30 seconds injection time. After the reaction, nitrogen purging is done at 20 cc/minute flow for 15 minutes followed by regeneration of catalyst at a temperature of 650° C. and the produced $CO_2$ is absorbed in solid adsorbent. The coke is determined from the weight difference of the solid absorbent. The liquid and the gas product are analyzed in HP 5880 simulated distillation analyzer and HP refinery gas analyzer respectively. Other specific analysis in the liquid product are specified in different examples separately.

TABLE 1

| Run No. | Catalyst | Feed | Reactor Temp. ° C. | Olefin in liquid product, wt % |
|---|---|---|---|---|
| 2734 | 60% M + 40% D | VBN | 570 | <0.5 |
| 2735 | 60% M + 40% D | CN | 570 | 5.7 |
| 2736 | M | CN | 570 | <0.5 |
| 2737 | M | VBN | 570 | <0.5 |
| 2738 | D | VBN | 570 | 6.0 |
| 2739 | D | CN | 570 | 5.3 |
| 2740 | 40% M + 60% D | CN | 570 | <0.5 |
| 2741 | 40% M + 60% D | VBN | 570 | <0.5 |
| 2755 | 80% M + 20% D | CN | 570 | Nil |
| 2756 | 70% M + 30% D | CN | 570 | Nil |
| 2757 | 70% M + 30% D | VBN | 570 | Nil |
| 2785 | 90% M + 10% L | KERO | 570 | Nil |
| 2901 | M | VBN | 625 | Nil |
| 2902 | M | VBN | 650 | Nil |
| 2903 | M | CN | 650 | Nil |
| 2904 | M | CN | 625 | Nil |
| 2906 | M | SRN | 650 | Nil |
| 2908 | M | KERO | 650 | Nil |
| 3062 | M | FCCN | 500 | Nil |
| 3078 | 80% M + 20% D | FCCN | 500 | Nil |
| | | VBN | | 18.7 |
| | | CN | | 43.2 |
| | | FCCN | | 55.0 |

EXAMPLE-2

Distribution of Aromatics in Liquid Product

This example illustrates the distribution of aromatics in the liquid product of the present invention. Results are summarized in Table-2. The data have been generated in fixed bed micro-reactor unit 4–5 hour$^{-1}$ WHSV within the temperature range of 570–650° C. Different proportions of various catalyst components have been physically mixed and the said mixture has been used in the reaction studies. The distribution of aromatics has been obtained from gas chromatography of the entire liquid product sample following abbreviations are applicable generally:

| T | Reactor temperature, ° C. |
|---|---|
| Ben | Benzene content in liquid, wt % |
| Tol | Toluene content in liquid, wt % |
| Xyl (or) | o-Xylene content in liquid, wt % |
| Xyl (m + p) | m & p-Xylene content in liquid, wt % |

It is observed that the RON of the liquid product is very high, exceeding even 100. The most important aspect is that the toluene and xylene content of the liquid product is very high whereas benzene content is relatively lower as compared to conventional naphtha reforming process. The total percentage of toluene and xylene together is more than 40% of the liquid product in many cases.

TABLE 2

| Run No. | Feed | Catalyst | T | Ben | Tol | Xyl (m + p) | Xyl (or) | RON |
|---|---|---|---|---|---|---|---|---|
| 2699 | VBN | 60% M + 30% D + 10% L | 570 | 0.74 | 23.4 | 19.3 | 5.3 | 106.8 |
| 2750 | VBN | M | 570 | 2.1 | 15.4 | 13.1 | 3.4 | 98.0 |
| 2751 | CN | M | 570 | 2.2 | 25.7 | 25.4 | 5.9 | 104.3 |
| 2752 | CN | 90% M + 10% D | 570 | 4.6 | 30 | 21.2 | 4.9 | 105.1 |
| 2753 | VBN | 90% M + 10% D | 570 | 3.2 | 19.8 | 15.5 | 3.1 | 97.8 |
| 2754 | VBN | 80% M + 20% D | 570 | 2.8 | 15.8 | 13.9 | 2.5 | 98.4 |
| 2755 | CN | 80% M + 20% D | 570 | 2.6 | 25.6 | 21.0 | 4.7 | 102.4 |
| 2756 | CN | 70% M + 30% D | 570 | 3.6 | 28.9 | 22.6 | 5.0 | 104.4 |
| 2757 | VBN | 70% M + 30% D | 570 | 3.4 | 20.2 | 16.2 | 3.9 | 104.3 |
| 3068 | FCCN | M | 500 | 3.0 | 17.5 | 18.5 | 5.0 | 103.2 |
| 3078 | FCCN | 80% M + 20% D | 500 | 3.63 | 20.8 | 21.7 | 5.32 | 102.3 |

EXAMPLE-3

Detailed 31 Group Component Analysis of Liquid Product

This example illustrates the detailed component analysis of some of the liquid product samples obtained in the process of the present of the present invention. For this purpose, a Gas Chromatograph (GC) equipped with FID and fitted with petrocol DH 100 m fused silica capillary column of 0.5 micro meter film thickness, 0.25 mm internal diameter, 40° C. 15 min hold, ramp 2° C./minute up to 200° C., sample size 0.2 micro liter, split 1:80, injector temperature 220° C. and detector temperature of 240° C. is used. List of the components along with their percentage weight in the liquid product of some of the experiments are given in Table-3. It is observed here that the yields of toluene and xylene are very high in most of the sample whereas benzene content is much lower as compared to the conventional naphtha reforming process. The 31 group components are defined below:

| Component No. | Compounds |
|---|---|
| 1 | Components eluting before n-butene |
| 2 | n-butane |
| 3 | Eluting between n-butane & iso-pentane |
| 4 | Iso-pentane |
| 5 | Eluting between iso-pentane and n-pentane |
| 6 | n-pentane |
| 7 | Eluting between n-pentane 2-methyl pentane |
| 8 | 2 & 3- methyl pentane & eluting between these two |
| 9 | Eluting between 3 methyl pentane & n-hexane |
| 10 | n-hexane |
| 11 | Eluting between n-hexane and benzene |
| 12 | Benzene |
| 13 | Eluting between benzene & 2-methyl hexane |
| 14 | 2 & 3 methyl hexane & between these two |
| 15 | Eluting between 3-methyl hexane & n-heptane |
| 16 | n-heptane |
| 17 | Eluting between n-heptane & toluene |
| 18 | Toluene |
| 19 | Eluting between toluene & 2-methyl heptane |
| 20 | 2 & 3-methyl heptane & between these two |
| 21 | Eluting between 3-methyl heptane & n-octane |
| 22 | n-octane |
| 23 | Eluting between n-octane & ethyl benzene |
| 24 | Ethyl benzene |
| 25 | Eluting between benzene & p-xylene |
| 26 | p & m - xylene |
| 27 | Eluting between m & o-xylene |
| 28 | o-xylene |
| 29 | Eluting after o-xylene & n-nonane |
| 30 | Eluting between n-nonane & n-decane |
| 31 | n-decane and after n-decane |

TABLE 3

| Run No. | 2751 | 2752 | 2755 | 2756 | 2757 |
|---|---|---|---|---|---|
| Feed | CN | CN | CN | CN | VBN |
| Catalyst | M | 90% M + 10% D | 80% M + 20% D | 80% M + 20% D | 70% M + 30% D |
| WHSV | 4.6 | 4.61 | 4.5 | 4.14 | 4.77 |
| Component | | | | | |
| 1 | 0 | 0 | 0 | 0 | 0 |
| 2 | 0 | 0 | 0 | 0 | 0 |
| 3 | 0 | 0 | 0 | 0 | 0 |
| 4 | 0 | 0 | 0 | 0 | 0 |
| 5 | 0 | 0 | 0 | 0 | 0.10 |
| 6 | 0 | 0 | 0 | 0 | 0.04 |
| 7 | 6.94 | 12.76 | 16.31 | 12.57 | 7.53 |
| 8 | 0.12 | 0.25 | 1.07 | 0.56 | 0.45 |
| 9 | 0.02 | 0.02 | 0.03 | 0.07 | 0.03 |
| 10 | 0.17 | 0.24 | 1.58 | 0.28 | 0.45 |
| 11 | 0.08 | 1.07 | 1.0 | 0.86 | 0.81 |
| 12 | 2.23 | 4.61 | 2.57 | 3.59 | 3.39 |
| 13 | 0.14 | 0.12 | 1.31 | 0.13 | 0.36 |
| 14 | 0.85 | 0.87 | 0.97 | 0.93 | 1.08 |
| 15 | 0.69 | 0.75 | 0.63 | 0.69 | 0.39 |
| 16 | 0.88 | 0.59 | 1.21 | 0.81 | 0.74 |
| 17 | 2.04 | 16.36 | 1.67 | 1.51 | 1.15 |
| 18 | 25.73 | 29.98 | 25.58 | 28.84 | 20.16 |
| 19 | 18.28 | 0.75 | 0.65 | 0.69 | 0.63 |
| 20 | 2.03 | 0.77 | 1.33 | 1.0 | 0.18 |
| 21 | 2.86 | 2.41 | 2.12 | 2.13 | 1.44 |
| 22 | 0.35 | 0.17 | 0.49 | 0.26 | 0.39 |
| 23 | 3.35 | 2.63 | 2.33 | 2.31 | 3.69 |
| 24 | 2.53 | 1.96 | 1.94 | 1.99 | 1.47 |
| 25 | 0.13 | 0.11 | 0.09 | 0.09 | 0.78 |
| 26 | 25.4 | 21.15 | 20.99 | 22.55 | 16.15 |
| 27 | 0.75 | 0.58 | 0.55 | 0.59 | 1.24 |
| 28 | 5.85 | 4.91 | 4.67 | 4.97 | 3.94 |
| 29 | 0.58 | 0.42 | 0.36 | 0.35 | 0.95 |
| 30 | 8.3 | 6.15 | 6.33 | 6.4 | 15.08 |
| 31 | 6.07 | 4.74 | 5.24 | 6.03 | 16.14 |
| RON | 104.3 | 105.1 | 102.4 | 104.4 | 104.3 |

EXAMPLE-4

Product Yield Pattern

This example illustrates the product yield pattern obtained in the process of the present invention. Results are summarized in Table-4. Various components in the catalyst have been mixed together the ratio as indicated and the said mixture is contacted with the feed in a fixed bed at 570° C. reactor temperature except Run no.2569 and 2570 where the reactor temperature is 625° C. and Run no.2579 where the the reactor temperature is 590° C. Similarly, in Run no.3062 to 3078, the reactor temperature is 500° C. Here, DG means dry gas which includes hydrogen $C_1$, $C_2$ hydrocarbons and $H_2S$. LIQ means liquid product which is expressed in wt % of feed. It is important to note that in the process of the present invention, it is possible to get gas and liquid yield, almost in same proportion. This is unlike conventional naphtha reforming process where the gas yield is maximum up to some 15 wt % feed and naphtha cracking process for making light olefins by thermal cracking route where the liquid yield is maximum up to 15% of feed. In contrast, in the process of the present invention, the gas/liquid ratio is within the range of 1–2. Similarly, the coke yield in most of the cases is also relatively small indicating lower investment and operating cost for the regenerator. The LPG yield in this process is very high ranging between 40–60 wt % of feed depending on feed olefin content. Such high LPG yield from olefinic naphtha has not been reported so far.

TABLE 4

| Run No. | Feed | Catalyst | WHSV | DG | LPG | LIQ | COKE |
|---|---|---|---|---|---|---|---|
| 2569 | VBN | 10% L + 90% M | 17 | 11.5 | 51.8 | 35.4 | 1.1 |
| 2570 | VBN | 10% L + 90% M | 4.3 | 18.5 | 56.5 | 23 | 1.9 |
| 2571 | VBN | 10% L + 90% M | 2.2 | 4.9 | 56.5 | 23 | 2.8 |
| 2573 | FCCN | 10% L + 90% M | 42.8 | 5.4 | 59.3 | 34.4 | 0.9 |
| 2574 | FCCN | 10% L + 90% M | 13.9 | 8.0 | 60.2 | 29.6 | 2.1 |
| 2576 | FCCN | 10% L + 90% M | 3.9 | 11.0 | 54.7 | 27.9 | 6.2 |
| 2579 | VBN | 10% L + 90% M | 16.6 | 7.0 | 47.4 | 44.6 | 1.0 |
| 2528 | CN | 20% L + 80% M | 41.7 | 5.2 | 49.6 | 44.5 | 0.7 |
| 2529 | CN | 20% L + 80% M | 16.3 | 6.3 | 54.4 | 38.2 | 1.1 |
| 2527 | CN | 10% L + 90% M | 16.6 | 6.9 | 55 | 37.1 | 1.0 |
| 2534 | VBN | 10% L + 90% M | 16.1 | 6.3 | 51.6 | 40.9 | 1.2 |
| 2535 | VBN | 10% L + 90% M | 10.2 | 7.6 | 54.5 | 36.7 | 1.2 |
| 2536 | VBN | 10% L + 90% M | 4.6 | 9.2 | 54.5 | 35.0 | 1.3 |

TABLE 4-continued

| Run No. | Feed | Catalyst | WHSV | DG | LPG | LIQ | COKE |
|---|---|---|---|---|---|---|---|
| 2659 | VBN | 100% M (BETA) | 3.95 | 10.5 | 47 | 33.4 | 8.9 |
| 2661 | CN | 100% M (BETA) | 3.8 | 8.5 | 46.9 | 37.3 | 7.3 |
| 2662 | CN | 100% M (BETA) | 4.0 | 8.8 | 49.4 | 34.9 | 6.8 |
| 2740 | CN | 40% M + 60% D | 4.2 | 13.7 | 38.7 | 37.4 | 9.2 |
| 2752 | CN | 90% M + 10% D | 4.6 | 13.2 | 40.6 | 41.9 | 3.5 |
| 2753 | VBN | 90% M + 10% D | 4.8 | 13.1 | 38.4 | 44.6 | 3.4 |
| 2754 | VBN | 80% M + 20% D | 4.4 | 15.0 | 43 | 36.5 | 4.0 |
| 2755 | CN | 80% M + 20% D | 4.5 | 13.1 | 36.9 | 45.4 | 4.0 |
| 2756 | CN | 70% M + 30% D | 4.1 | 15.1 | 44.6 | 34.6 | 5.0 |
| 2757 | VBN | 70% M + 30% D | 4.8 | 13.4 | 37.5 | 43.6 | 4.8 |
| 3062 | FCCN | 100% M | 5.1 | 11.8 | 43.0 | 39.9 | 2.5 |
| 3068 | SRN1 | 100% M | 5.5 | 5.2 | 38.7 | 53.7 | 1.3 |
| 3067 | SRN1 | 80% M + 20% D | 4.1 | 6.8 | 46.1 | 45.8 | 1.9 |
| 3071 | SRN2 | 80% M + 20% D | 3.9 | 8.6 | 30.6 | 51.5 | 1.7 |
| 3078 | FCCN | 80% M + 20% D | 4.1 | 6.8 | 37.0 | 42.0 | 3.5 |

EXAMPLE-5

Yield of Light Olefins

This example illustrates the yield of light olefins e.g. ethylene, propylene, butylene and iso-butylene in the present invention. Results are summarized in Table-5. Here, Ethy indicates ethylene, Prop indicates Propylene, Buty indicates butylene, i-B indicates iso-butylene, all expressed as wt % of feed. It is important to note here that the propylene yield in our process is as high as 23% and ethylene yield is also more than 18%. This means the propylene to ethylene ratio in our process is mostly above 1 where as the same in naphtha cracking (thermal) is usually less than 2. Total yield of olefins in our process is also quite high (about 40–50% of feed). It may be noted here that butylene yield in this process is about 8–15% which is also significantly higher than the same for thermal cracking of naphtha.

TABLE 5

| Run No. | Feed | Catalyst | T | LPG | Ethy | Prop | Buty | i - B |
|---|---|---|---|---|---|---|---|---|
| 2737 | VBN | 100% M | 570 | 45.9 | 9.7 | 16.0 | 9.7 | 2.3 |
| 2901 | VBN | 100% M | 625 | 40.4 | 14.0 | 18.7 | 9.8 | 3.6 |
| 2902 | VBN | 100% M | 650 | 37.8 | 18.6 | 20.6 | 8.4 | 3.1 |
| 2757 | VBN | 70% M + 30% D | 570 | 37.5 | 8.5 | 9.4 | 7.6 | 1.8 |
| 2736 | CN | 100% M | 570 | 44.8 | 9.1 | 14.8 | 8.9 | 3.5 |
| 2904 | CN | 100% M | 625 | 38.1 | 15.1 | 19.0 | 8.8 | 3.2 |
| 2903 | CN | 100% M | 650 | 35.9 | 17.7 | 20.0 | 7.9 | 2.9 |
| 2576 | FCCN | 90% M + 10% L | 570 | 54.7 | 6.9 | 23.7 | 15.6 | 5.9 |
| 2659 | VBN | 100% M (BETA) | 570 | 47.0 | 4.3 | 11.8 | 9.0 | 3.2 |
| 2661 | CN | 100% M (BETA) | 570 | 46.9 | 4.1 | 13.62 | 9.1 | 3.4 |
| 2662 | CN | 100% M (BETA) | 570 | 49.4 | 4.5 | 14.7 | 9.5 | 3.6 |
| 2574 | FCCN | 10% L + 90% M | 570 | 60.2 | 6.5 | 27.5 | 17.9 | 7.8 |
| 2571 | VBN | 10% L + 90% M | 570 | 56.5 | 7.2 | 19.3 | 14.9 | 4.3 |
| 2740 | CN | 40% M + 60% D | 570 | 38.7 | 9.0 | 14.8 | 9.0 | 3.6 |

TABLE 5-continued

| Run No. | Feed | Catalyst | T | LPG | Ethy | Prop | Buty | i - B |
|---|---|---|---|---|---|---|---|---|
| 2754 | VBN | 80% M + 20% D | 570 | 43.0 | 9.1 | 13.5 | 7.6 | 3.0 |
| 2756 | CN | 70% M + 30% D | 570 | 44.6 | 9.5 | 14.6 | 8.4 | 3.3 |

EXAMPLE-6

Hydrogen Yield

This example illustrates the hydrogen producing ability of the present invention. Results are summarized in Table-6. It is seen in the table that it is possible to get hydrogen up to 0.6–1.4 wt % of feed as compared to some 1.5 wt % hydrogen make in conventional naphtha reforming process. Therefore, by following this route, one may get some hydrogen as a by-product along with other products e.g. light olefins and highly aromatized gasoline. The important issue is that the conventional reforming process can not handle olefinic naphtha streams and also steam reforming of naphtha usually cannot process naphtha with high olefin content. This is mainly due to the higher coke make and consequent catalyst deactivation owing to higher amount of olefin present in the feed. In contrast, our invention welcomes feed with as much olefins as possible and produce hydrogen, light olefins and aromatics through continuous regeneration of catalyst. Interestingly, our invention, therefore, does not call for and feed hydrotreatment which is so essential for conventional naphtha reforming process.

TABLE 6

| Run No. | Feed | Catalyst | T | WHSV | $H_2$ wt % |
|---|---|---|---|---|---|
| 2738 | VBN | 100% D | 570 | 4.0 | 1.34 |
| 2739 | CN | 100% D | 570 | 5.1 | 1.35 |
| 2740 | CN | 40% M + 60% D | 570 | 4.2 | 1.06 |
| 2741 | VBN | 40% M + 60% D | 570 | 5.1 | 1.04 |
| 2792 | VBN | 100% D | 570 | 5.3 | 1.37 |
| 2756 | CN | 70% M + 30% D | 570 | 4.1 | 0.68 |
| 2757 | VBN | 70% M + 30% D | 570 | 4.8 | 0.67 |

EXAMPLE-7

Stability of Catalyst

Conventionally, the catalyst employed in the catalytic reforming process is unable to withstand high temperature beyond some 550° C. This is due to the sintering of the cylindrical catalyst extrudates at such higher temperatures. For this reason, the regeneration and the coke burning of the reforming catalyst is under very controlled condition so as to avoid high temperature above 450° C. usually. Since the process of the present invention involve temperature upto 750° C., it is necessary that the catalyst is stable at this temperature range. To study this catalyst stability, we have particularly chosen the dehydrogenating component of the catalyst since other components are already having proven stability in the conditions prevailing which are similar to those in conventional fluid catalytic cracking (FCC) process.

For this stability study, catalyst used is 100% D and the reactor is fixed bed as mentioned in Example-1. Repeated reaction regeneration cycles were run and the product yield data were obtained with visbreaker naphtha feed to see the catalyst stability. Temperatures for reaction and regeneration were maintained at 570° C. and 650° C. respectively. Results are summarized below in Table-7.

TABLE 7

| Run No. | Cycle No. | WHSV | DG | LPG | LIQ |
|---|---|---|---|---|---|
| 2692 | 1 | 5.3 | 6.3 | 23.6 | 54.9 |
| 2694 | 2 | 4.1 | 6.6 | 19.2 | 58.9 |
| 2695 | 3 | 4.5 | 6.4 | 18.7 | 59.4 |
| 2696 | 4 | 4.1 | 6.8 | 18.8 | 53.8 |
| 2697 | 5 | 4.1 | 7.1 | 19.3 | 56.1 |
| 2698 | 6 | 4.1 | 7.0 | 18.7 | 56.5 |

Here, cycle no. indicates the no. of reaction/regeneration done on the catalyst. DG, LPG and LIQ, are dry gas, LPG and liquid product collected, all expressed in wt % of feed. It is observed that after the first cycle, the catalyst has attained stability in terms of the selectivity of the above products. This stability of the catalyst at higher temperature of regeneration as at 650° C. here actually allows us to operate the catalyst in continuous reaction regeneration cycle under circulating fluidized bed.

EXAMPLE-8

Circulating Pilot Plant Data

This example illustrates the performance of the catalyst in a circulating pilot plant test unit. Feed used here corresponds to Visbreaker naphtha (VBN) as defined in Example-1. The pilot plant consists of a small riser reactor which ends at the bottom of the dense bed reactor. The riser diameter is 0.6 cm and the dense bed reactor diameter is 2.54 cm. The dense bed reactor is used here to achieve the low WHSV condition in the present studies. Typical feed rate used is 2.6 grams per minute. The feed is injected at the riser bottom after preheating at 240° C. The hot regenerated catalyst is circulated from the regenerator standpipe using fluidization nitrogen.

The spent catalyst is withdrawn from the bottom of the dense bed reactor system into the stripper by using counter current stripping nitrogen and the ensuing stripped out catalyst is recycled back to the regenerator. Following conditions and yields are observed in a particular run:

| | |
|---|---|
| Reactor temperature | 570° C. |
| Catalyst | 100% M |
| Feed | VBN |
| WHSV | 5.0 |
| Hydrogen | 0.2 wt % |
| DG | 15.6 wt % |
| LPG | 54.5 wt % |
| Liq. Product | 26.3 wt % |
| Coke | 3.4 wt % |

This example shows that the present catalyst system and the desired conditions can be operated in a continuous regeneration system with continuous catalyst circulation between reactor and regenerator.

We claim:

1. A process for upgrading olefinic hydrocarbon streams through simultaneous cracking and reforming comprising the steps of injecting hydrocarbon feed into a bottom of a short riser in a reactor, passing the hydrocarbon feed through the short riser in presence of hot catalyst mixture, terminating the hydrocarbon feed to a bubbling bed connected to the short riser in presence of hot catalyst mixture, separating product at the top of the reactor, withdrawing spent catalyst from the reactor after steam purging, regenerating the spent catalyst by burning coke deposited in the spent catalyst during reaction in presence of air, and recirculating the regenerated catalyst back to the reactor, wherein the reaction results in liquid product having not less than 15 wt % each of toluene and xylene, less than 0.5 wt % of olefin and less than 5 wt % of benzene, and a gaseous product rich in hydrogen, ethylene, propylene and butylene yield, and wherein the catalyst mixture consists of dehydrogenating metal component, medium pore shape selective zeolite component, and large pore acidic crystalline or amorphous component, the catalyst being in micro-spherical form having particle size within 20–150 microns and having a total dehydrogenating metal content in the range of 0.05–2.0 wt %.

2. A process as claimed in claim 1 wherein contact time in the short riser is below 0.5 second and weight hourly space velocity (WHSV) of the reactor is between 0.1–60 $hour^{-1}$.

3. A process as claimed in claim 1 wherein the hydrocarbon feed comprises at least 10 wt % of olefins with its 95% true boiling point lower than 400° C. and the stream comprises at least one of a full range FCC gasoline, a coker gasoline, a kerosene, visbreaker naphtha, visbreaker gas oil, a pyrolysis gasoline and mixtures thereof.

4. A process as claimed in claim 1 wherein the reactor temperature is between 450–750° C.

5. A process as claimed in claim 1 wherein the pressure in the reactor is within 0.1–15 atm(g).

6. A process as claimed in claim 1 wherein the dehydrogenating metal component in the catalyst is selected from the group consisting of Platinum, Palladium, Rhenium, Molybdenum, Tungsten, or Nickel and a mixture thereof.

7. A process as claimed in claim 6 wherein the medium pore shape selective zeolite component is selected from the group consisting of ZSM-5, beta zeolite, an equivalent zeolite having silica to alumina ratio within 18–50 and pore diameter between 5–8 Å, and a mixture thereof.

8. A process as claimed in claim 1 wherein the large pore acidic component is selected from the group consisting of rare earth exchanged Y-zeolite, acidic matrix of silica-alumina, and a mixture thereof.

9. A process as claimed in claim 8 wherein the total surface area of the acidic component is with 90–200 $m^2/gram$.

10. A process as claimed in claim 1 wherein the reaction system comprises a circulating fluidized bed reactor-regenerator having continuous catalyst circulation, and the spent catalyst is continuously withdrawn from the reactor after steam purging, regenerated in the regenerator by burning coke fully or partially in presence of air, and recirculated to the bottom of the short riser.

11. A process as claimed in claim 1 wherein total yield of $C_3$ and $C_4$ hydrocarbons is between 30 to 60 wt % of the hydrocarbon feed, and total yield of propylene and butylene is not less than 50% of the total yield of $C_3$ and $C_4$ hydrocarbons.

12. A process as claimed in claim 1 wherein gasoline in the product has a octane number of not less than 98 RON and contains at least 15 wt % of toluene and xylene.

13. A process as claimed in claim 1 wherein the bubbling bed reactor is a dense bed.

14. A process as claimed in claim 1 wherein the bubbling bed reactor is a turbulent fluidized bed reactor.

15. A process as claimed in claim 1 wherein the weight hourly space velocity (WHSV) of the reactor is between 0.5–30 $hour^{-1}$.

16. A process as claimed in claim 4 wherein the reactor temperature is between 500 to 650° C.

17. A process as claimed in claim 16 wherein the reactor temperature is between 500 to 600° C.

18. A process as claimed in claim 5 wherein the pressure in the reactor is within 0.5–2.5 atm(g).

19. A process as claimed in claim 9 wherein the total surface area of the acidic component is with 120–180 $m^2/gram$.

20. A process as claimed in claim 6 wherein the metal content in the catalyst is in a range of 0.05–2 wt %.

* * * * *